(12) United States Patent
Matsumoto et al.

(10) Patent No.: US 12,742,747 B2
(45) Date of Patent: Sep. 22, 2026

(54) GAS SENSOR

(71) Applicant: Niterra Co., Ltd., Nagoya (JP)

(72) Inventors: Hidenari Matsumoto, Nagoya (JP); Sunchao Liu, Nagoya (JP); Masashi Nomura, Nagoya (JP)

(73) Assignee: Niterra Co., Ltd., Nagoya (JP)

( * ) Notice: Subject to any disclaimer, the term of this patent is extended or adjusted under 35 U.S.C. 154(b) by 308 days.

(21) Appl. No.: 18/366,883

(22) Filed: Aug. 8, 2023

(65) Prior Publication Data

US 2024/0053294 A1 Feb. 15, 2024

(30) Foreign Application Priority Data

Aug. 15, 2022 (JP) ................................ 2022-129173
Apr. 17, 2023 (JP) ................................ 2023-067080

(51) Int. Cl.
*G01N 27/406* (2006.01)
*H01R 13/24* (2006.01)
*G01N 27/407* (2006.01)
*H01R 13/33* (2006.01)

(52) U.S. Cl.
CPC ..... *G01N 27/4062* (2013.01); *H01R 13/2407* (2013.01); *G01N 27/407* (2013.01); *H01R 13/2464* (2013.01); *H01R 13/33* (2013.01)

(58) Field of Classification Search
CPC ............ G01N 27/4062; G01N 27/407; H01R 13/2407; H01R 13/2464; H01R 13/33; H01R 2201/20; H01R 13/66
See application file for complete search history.

(56) References Cited

U.S. PATENT DOCUMENTS 9,847,592 B2 12/2017 Hino
2008/0295576 A1* 12/2008 Yamauchi .......... G01N 27/4062 73/23.31

FOREIGN PATENT DOCUMENTS

JP 2017-116273 A 6/2017

* cited by examiner

*Primary Examiner* — Benjamin R Schmitt
(74) *Attorney, Agent, or Firm* — Sughrue Mion, PLLC

(57) ABSTRACT

A gas sensor (1) including: a sensor element (21) having an electrode pad (24); a metal terminal (75) electrically connected to the electrode pad via a contact portion C1; and a separator (91) retaining the metal terminal, wherein the metal terminal includes a stopper portion (75*p*) extending in a direction crossing the axial-line O direction, and where, in a pair of one of an electrode pad (241) and one of a metal terminal (751) connected thereto, as seen along a widthwise direction of the sensor element, an end of the one electrode pad that is closest to one inner surface 91*si* of the separator is defined as a pad end, a distance between the pad end and the contact portion is defined as DA, and a distance between the one inner surface of the separator and a distal end of the stopper portion is defined as DB, DA>DB is satisfied.

12 Claims, 4 Drawing Sheets

GAS SENSOR

BACKGROUND OF THE DISCLOSURE

1. Field of the Disclosure

The present disclosure relates to a gas sensor including a sensor element for detecting the concentration of a detection target gas, and a metal terminal.

2. Description of the Related Art

As a gas sensor for detecting the concentration of oxygen or NOx in exhaust gas of an automobile or the like, a gas sensor having a plate-shaped sensor element using a solid electrolyte is known.

As this type of gas sensor, a widely used one is configured such that a plurality of electrode pads (electrode terminal portions) are provided on the rear-end sides of opposed main surfaces of a plate-shaped sensor element. Bar-shaped (wire-shaped) metal terminals electrically contact respective electrode pads, to externally receive output signals from the sensor element or to supply power to a heater overlaid on the sensor element (Patent Document 1).

The above metal terminals each include a spring-contact portion contacting the electrode pad, and a spring-retention portion folded back from the spring-contact portion. The spring-retention portion is retained by a separator (insulator).

[Patent Document 1] Japanese Patent Application Laid-Open (kokai) No. 2017-116273

3. Problems to be Solved by the Disclosure

As seen in the widthwise direction of the sensor element, for example, the spring-contact portion of the bar-shaped metal terminal almost point-contacts the electrode pad. Therefore, if the spring-contact portion is swayed in the widthwise direction due to vibration during assembly or use of the gas sensor, or the like, connection with the electrode pad might be broken, thus lowering reliability of electric connection.

SUMMARY OF THE DISCLOSURE

Accordingly, an object of the present disclosure is to provide a gas sensor in which displacement of a metal terminal in the widthwise direction of a sensor element is reduced, thus ensuring electric connection between the metal terminal and an electrode pad of the sensor element.

The above object has been achieved by providing a gas sensor comprising: a sensor element extending in an axial-line direction and having an electrode pad on a rear-end-side outer surface thereof; a metal terminal extending in the axial-line direction and electrically connected to the electrode pad via a contact portion; and a tubular separator extending in the axial-line direction and retaining a rear-end side of the metal terminal, wherein the metal terminal includes a stopper portion extending in a direction crossing the axial-line direction, the contact portion and the stopper portion are housed inside the separator, and where, in a pair of one of said electrode pad and one of said metal terminal connected thereto, as seen along a widthwise direction of the sensor element, an end of the one electrode pad that is closest to one inner surface of the separator is defined as a pad end, a distance between the pad end and the contact portion is defined as DA, and a distance between the one inner surface of the separator and a distal end of the stopper portion is defined as DB, DA>DB is satisfied.

In a case where a spring-contact portion is swayed in the widthwise direction due to vibration during assembly or use of the gas sensor, or the like, the stopper portion contacts the inner surface of the separator when the sway becomes maximum. The maximum sway width at this time becomes DB.

Meanwhile, with this gas sensor, the distance DA between the pad end and the contact portion is greater than DB. In this configuration, even when the spring-contact portion is maximally swayed so that the stopper portion contacts the inner surface, the contact portion is still at a position on the inner side relative to the pad end (i.e., the contact portion is kept in contact with the electrode pad). Therefore, it is possible to prevent such connection of the metal terminal (in particular, a rod-shaped one) with the electrode pad from becoming broken and reliability of electric connection from becoming lowered.

In a preferred gas sensor of the present disclosure, the stopper portion is provided at a position different from the contact portion.

With this gas sensor, the stopper portion can be provided at a position different from the contact portion in accordance with the inner surface shape of the separator, or the like. Thus, the degree of freedom in designing is improved.

In another preferred embodiment of the gas sensor of the present disclosure, the metal terminal has a bar shape.

The bar-shaped metal terminal is readily displaced in the widthwise direction of the sensor element, and therefore the present disclosure can be effectively applied thereto.

Effects of the Disclosure

The present disclosure makes it possible to provide a gas sensor in which displacement of a metal terminal in the widthwise direction of a sensor element is reduced, thus ensuring electric connection between the metal terminal and an electrode pad of the sensor element.

DESCRIPTION OF REFERENCE NUMERALS

Figure 1:
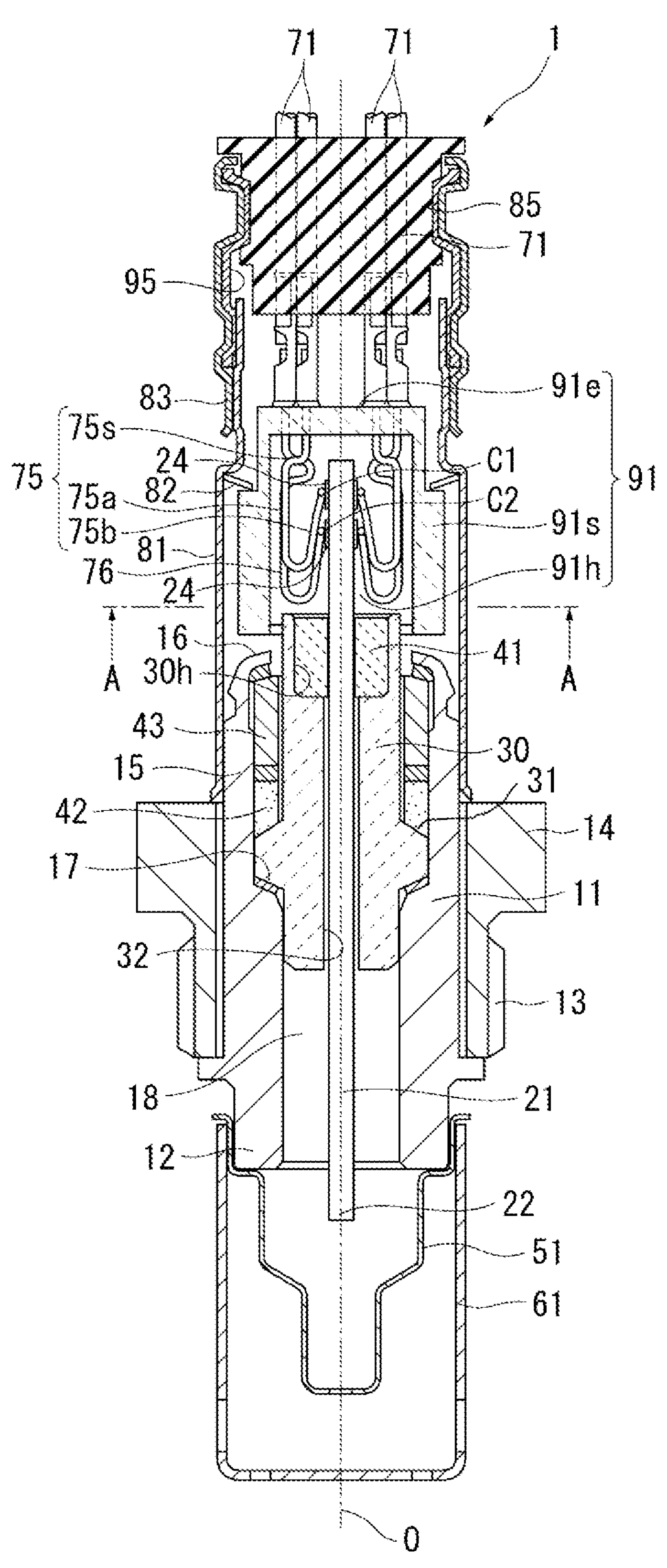
FIG. 1 is a sectional view of a gas sensor according to an embodiment of the present disclosure.

Reference numerals used to identify various features in the drawings include the following.

1 gas sensor

21 sensor element

54 electrode pad

241, 242 one electrode pad

75, 175 metal terminal

751, 752 one metal terminal

75*p*, 175*p* stopper portion
91 separator
91*si* inner surface of the separator
C1 contact portion
O axial line

DETAILED DESCRIPTION OF THE PREFERRED EMBODIMENTS

Figure 2:
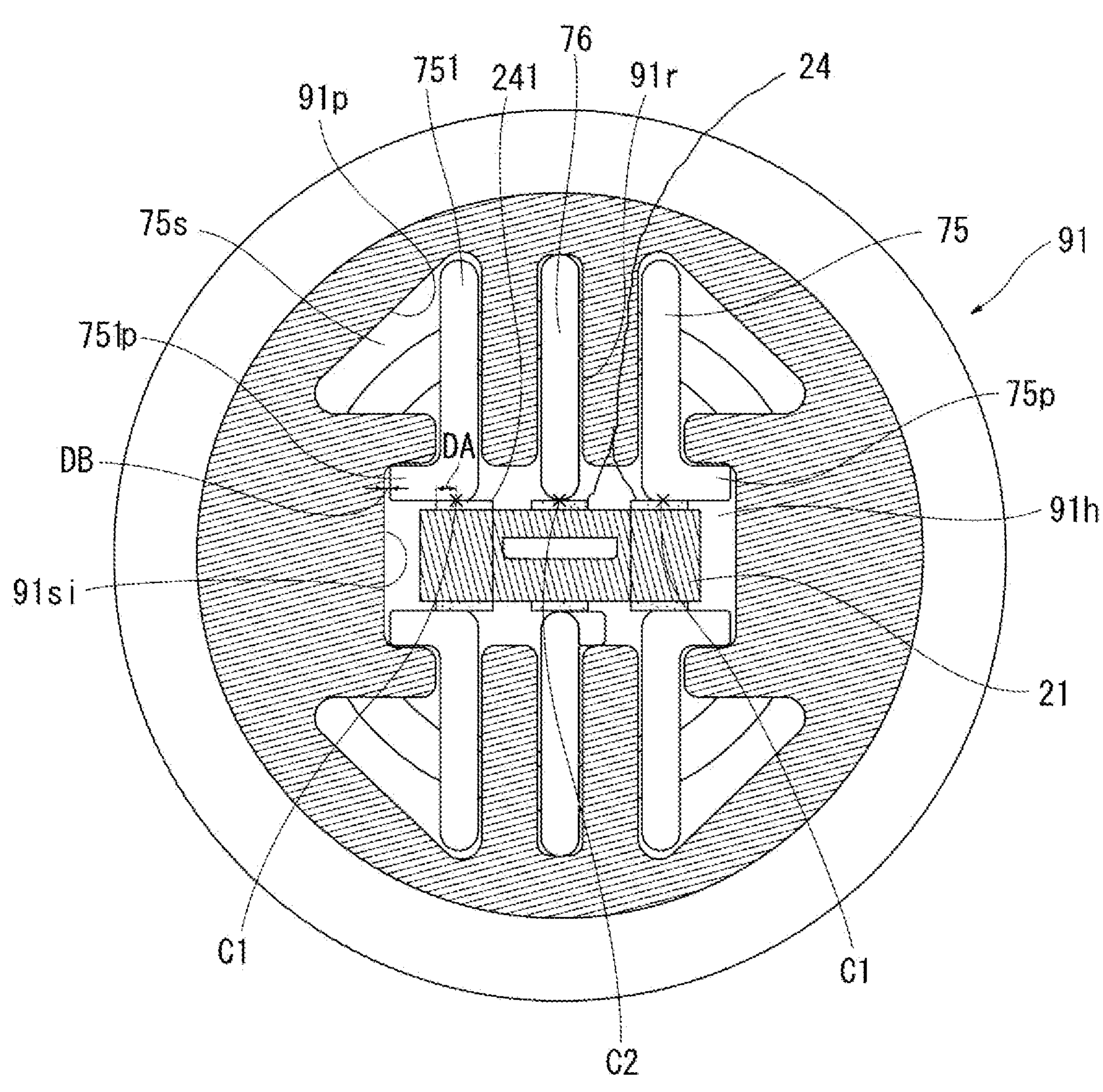
FIG. 2 is a sectional view along line A-A in FIG. 1.
Figure 3:
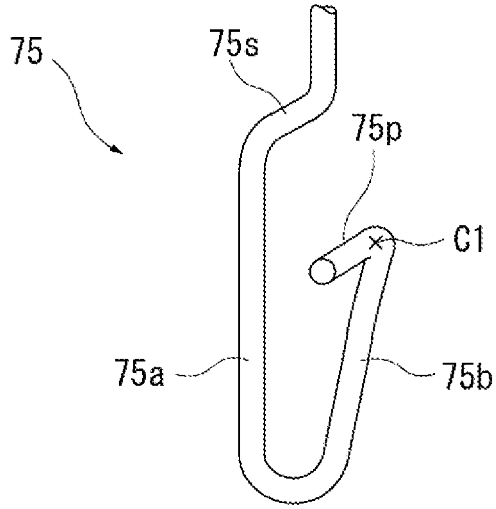
FIG. 3 is a perspective view showing a metal terminal.

An embodiment of the present disclosure will now be described in detail with reference to FIGS. 1 to 3. However, the present disclosure should not be construed as being limited thereto. FIG. 1 is a sectional view of a gas sensor 1 according to the embodiment of the present disclosure. FIG. 2 is a sectional view along line A-A in FIG. 1. FIG. 3 is a perspective view showing a metal terminal 75.

In FIG. 1, the gas sensor (NOx sensor) 1 includes a sensor element 21; a holder (ceramic holder) 30 having a through hole 32 which penetrates in the direction of an axial line O and into which the sensor element 21 is inserted; a housing 11 which surrounds a circumference of the ceramic holder 30 in a radial direction; and a separator 91.

A forward end portion of the sensor element 21, where a detection section 22 is formed, projects forward from the ceramic holder 30.

On the rear-end side of the through hole 32 of the ceramic holder 30, a filling hole 30*h* communicating with the through hole 32 is formed. With the filling hole 30*h* filled with a seal material (in this example, talc) 41, the sensor element 21 is retained in the through hole 32 of the ceramic holder 30 in an airtight state.

On the rear-end side of the ceramic holder 30, the separator 91 for retaining a plurality of metal terminals 75, 76 is provided. The separator 91 is formed in a bottomed cylindrical shape and has a bottom portion 91*e* on the rear-end side.

As shown in FIG. 2, inside a side wall 91*s* of the separator 91, a plurality of retention grooves 91*r* for retaining the metal terminals 75, 76 are formed along the axial-line-O direction.

Each metal terminal 75 has a bent portion 75*s* extending radially outward. Inside the side wall 91*s* of the separator 91, an opposed wall 91*p* facing obliquely is formed for engaging the bent portion 75*s*.

One metal terminal 75 is provided on each of both end sides in the widthwise direction of the sensor element 21, and one metal terminal 76 is provided at the center in the widthwise direction of the sensor element 21.

At a center part of the separator 91, a center hole 91*h* in which the sensor element 21 is placed is formed, and the plurality of retention grooves 91*r* communicate with the center hole 91*h*. The metal terminals 75, 76 contact with electrode pads 24 (FIG. 1) of the sensor element 21 via the retention grooves 91*r* and the center holes 91*h*.

The bottom portion 91*e* of the separator 91 has a pass hole (not shown) for the metal terminals 75, 76.

Returning to FIG. 1, the rear-end-side part of the sensor element 21 protrudes rearward of the ceramic holder 30 and the housing 11, and the metal terminals 75, 76 are pressed in contact with the electrode pads 24 formed at the rear-end-side part, so as to be electrically connected therewith.

The metal terminal 76 is located on the front-end side relative to the metal terminals 75. Also, the electrode pad 24 electrically connected to the metal terminal 76 via a contact portion C2 is located on the front-end side relative to the electrode pads 24 electrically connected to the metal terminals 75 via contact portions C1.

The rear-end sides of the metal terminals 75, 76 are connected to lead wires 71, and the lead wires 71 are led outside through a seal material 85.

The rear-end-side part of the sensor element 21 including the electrode pads 24 is covered by an outer casing 81. Hereinafter, description will be given in more detail.

The sensor element 21 extends in the direction of the axial line O and has a strip-plate-like shape (plate-like shape). The sensor element 21 has a detection section 22 provided on a forward end portion (the lower side in FIG. 1) directed toward a measurement target. The detection section 22 is composed of detection electrodes, etc. (not shown) and detects a particular gas component contained in a gas to be detected. The sensor element 21 has a rectangular transverse cross section whose size is constant in the forward-rearward direction. The sensor element 21 is formed mainly of a ceramic material (solid electrolyte, etc.) such that the sensor element 21 has an elongated shape.

This sensor element 21 itself is the same as a conventionally known sensor element. A pair of detection electrodes which constitute the detection section 22 are disposed on a forward end portion of the solid electrolyte (member). The electrode pads 24 which are connected to the detection electrodes and to which the lead wires 71 for taking out detection output are connected are formed on a rear end portion of the solid electrolyte (member) that is to be exposed to the outside.

In the present example, a heater (not shown) is provided in a forward end portion of a ceramic member laminated on the solid electrolyte (member) of the sensor element 21. Electrode pads 24 to which lead wires 71 for applying a voltage to the heater are connected are formed on a rear end portion of the ceramic member that is to be exposed to the outside.

Although not illustrated, these electrode pads 24 are formed to have a longitudinally elongated rectangular shape and are disposed on the rear end portion of the sensor element 21, for example, in such a manner that three or two electrode terminals are juxtaposed laterally on each of wider surfaces (opposite surfaces) of the strip plate.

Notably, a porous protective layer (not shown) formed of alumina, spinel, or the like is provided to cover the detection section 22 of the sensor element 21.

The housing 11 is tubular and has concentric portions which are juxtaposed in the forward-rearward direction and have different diameters. Specifically, the housing 11 has a cylindrical annular portion (hereinafter also referred to as the cylindrical portion) 12 which is provided on the forward end side, which is small in diameter, and onto which a protector 51, 61 is fixedly fitted. A screw 13 which is larger in diameter than the cylindrical portion 12 and is used for fixing to an exhaust pipe of an engine is provided on an outer circumferential surface on the rearward side (the upper side in the drawing) of the cylindrical portion 12. The housing 11 has a polygonal portion 14 provided on the rearward side of the screw 13. A tool engages with the polygonal portion 14 for turning the screw 13, to thereby fix the sensor 1. Also, the housing 11 has a cylindrical portion 15 provided on the rearward side of the tool engagement portion 14. The protecting tube (outer casing) 81, which covers a rear portion of the gas sensor 1 is fitted onto and welded to the cylindrical portion 15. The housing 11 has a crimping cylindrical portion 16 provided on the rearward side of the cylindrical portion 15. The crimping cylindrical portion 16 has an outer diameter and a wall thickness smaller than those of the cylindrical portion 15.

Notably, in FIG. 1, the crimping cylindrical portion 16 has an inwardly bent shape because the crimping cylindrical portion 16 has been crimped.

Meanwhile, the housing 11 has an internal hole 18 which penetrates the housing 11 in the direction of the axial line O. The inner circumferential surface of the internal hole 18 has a step portion 17 tapered such that the step portion tapers radially inward from the rear end side toward the forward end side.

The ceramic holder 30, which is formed of an insulating ceramic material (for example, alumina) and is formed into an approximately short cylindrical shape, is disposed inside the housing 11. The ceramic holder 30 has a flange portion 31. A frontward-facing surface of the flange portion 31 engages the step portion 17, and the ceramic holder 30 is pressed by the crimping cylindrical portion 16 via a seal material 42, a sleeve 43, and the like from the rear-end side. Thus, the ceramic holder 30 is clearance-fitted and positioned inside the housing 11.

A front-end part of the sensor element 21 is covered by the bottomed-cylindrical protectors (protection covers) 51, 61 respectively having vent holes and formed in a double-layer structure in the present embodiment. The rear ends of the protectors 51, 61 are externally fitted and welded to the cylindrical portion 12 of the housing 11.

Also, as shown in FIG. 1, on account of the spring characteristics of the respective metallic terminals 75, 76, the respective metallic terminals 75, 76, which are provided at the tips of the respective lead wires 71 extending to the outside through the seal member 85, are brought into pressure contact with respective electrode pads 24 formed on the rear end portion of the sensor element 21, whereby the respective metallic terminals 75, 76 are electrically connected to the respective electrode pads 24. In the gas sensor 1 of the present example, the respective metallic terminals 75, 76, including their pressure contact portions, are provided in respective retention grooves (FIG. 2) 91*r* provided in an insulating separator 91 disposed in the outer casing 81. The separator 91 is engaged with a disc spring 82 provided in the outer casing 81.

A protection outer casing 83 is fitted to an outer surface on the rear-end side of the outer casing 81, and the seal member (e.g., rubber) 85 is provided inside the protection outer casing 83. A water-repellent ventilation filter 95 is interposed between the outer casing 81 and the protection outer casing 83.

Notably, the lead wires 71 extend to the outside through the seal member 85 disposed inside a rear end portion of the outer casing 81. This seal member 85 is compressed by reducing the diameter of this protection outer casing 83 by means of crimping, whereby the gastightness of this portion is maintained.

Next, with reference to FIG. 2 and FIG. 3, the metal terminal 75 will be described.

In this example, the metal terminal 75 is a bar-shaped terminal whose sectional shape is a circle or a polygon having an aspect ratio of 1:1.0 to 1:1.2 (in this example, the sectional shape is a circle), and is made from a metal wire material. However, the metal terminal 75 is not limited to a bar shape, and may have a plate shape obtained by cutting and pressing a metal plate, for example.

The metal terminal 75 includes a body portion 75*a* extending in the axial-line-O direction and a spring-contact portion 75*b* integrated therewith and folded back toward the sensor element 21 from the front end of the body portion 75*a*. The spring-contact portion 75*b* elastically deflects in the radial direction relative to the body portion 75*a*, so that the spring-contact portion 75*b* contacts the electrode pad 24.

The rear-end side of the body portion 75*a* is connected to the lead wire 71 via a crimp terminal.

Here, as shown in FIG. 2 and FIG. 3, the metal terminal 75 includes a stopper portion 75*p* extending in a direction (in FIG. 2, a direction along the main surface of the sensor element 21) crossing the axial-line-O direction. Specifically, the stopper portion 75*p* is formed by bending a distal end (serving as a free end) of the spring-contact portion 75*b* in an L shape toward the direction along the main surface of the sensor element 21.

The contact portion C1 and the stopper portion 75*p* of the metal terminal 75 are housed inside the separator 91.

The reason for specifying that the stopper portion 75*p* "extends in the direction crossing the axial-line-O direction" is as follows. If the stopper portion 75*p* extends in the axial-line-O direction, the stopper portion 75*p* cannot contact one inner surface 91*si* of the separator 91 as described below, and therefore displacement of the stopper portion 75*p* (metal terminal 75) in the widthwise direction of the sensor element 21 cannot be reduced.

Here, a pair of one electrode pad 241 and one metal terminal 751 connected thereto will be considered. The electrode pad 241 is located at the leftmost position, of the three electrode pads 24 on one main surface (upper surface in FIG. 2) of the sensor element 21. The metal terminal 751 is located at the left position, of the two metal terminals 75.

In the pair of the electrode pad 241 and the metal terminal 751 described above, as seen along the widthwise direction of the sensor element 21, an end of the electrode pad 241 that is closest to the one inner surface 91*si* (inner surface of side wall 91*s*) of the separator 91 is defined as a pad end, the distance between the pad end and the contact portion C1 is defined as DA, and the distance between the one inner surface 91*si* and the stopper portion 751*p* of the metal terminal 751 is defined as DB. Then, DA>DB is satisfied. Here, the one inner surface 91*si* is the left inner surface, of the two inner surfaces of the separator 91 in the widthwise direction of the sensor element 21, and is the inner surface closer to the electrode pad 241 and the metal terminal 751.

In this configuration, in a case where the spring-contact portion 75*b* is swayed in the widthwise direction due to vibration during assembly or use of the gas sensor 1, or the like, the stopper portion 751*p* contacts the inner surface 91*si* when the sway becomes maximum. The maximum sway width at this time becomes DB.

Meanwhile, the distance DA between the pad end and the contact portion C1 is greater than DB. Therefore, even when the spring-contact portion 75*b* is maximally swayed so that the stopper portion 751*p* contacts the inner surface 91*si*, the contact portion C1 is still at a position on the inner side relative to the pad end (i.e., the contact portion C1 is kept in contact with the electrode pad 241). Therefore, it is possible to prevent such connection of the metal terminal 751 (in particular, a rod-shaped one) with the electrode pad 241 from becoming broken and reliability of electric connection from becoming lowered.

In this example, the metal terminal 75 and the spring-contact portion 75*b* have a rod shape whose sectional shape is a circle, and the spring-contact portion 75*b* almost point-contacts with the electrode pad 24. Therefore, the contact portion C1 is determined to be one point. On the other hand, in a case where the metal terminal 75 has a bar whose sectional shape is a polygon or plate shape, the contact portion C1 may have an area in a certain range in the direction (widthwise direction) along the main surface of the sensor element 21. In this case, the midpoint in the widthwise direction of the area is taken as the contact portion C1.

The contact portion C1 is determined by acquiring a CT (Computed Tomography) image of the gas sensor 1 from the axial-line-O direction and viewing an image near the contact point between the spring-contact portion 75*b* and the electrode pad 24 in a sectional view as shown in FIG. 2.

While an embodiment of the present disclosure has been described above, the present disclosure is not limited to the above embodiment, and may be carried out in various manners without deviating from the scope of the present disclosure.

For example, in the above embodiment, the stopper portion 75*p* is formed by bending the distal end of the spring-contact portion 75*b* in an L shape, and thus the stopper portion 75*p* and the contact portion C1 are located on the same line as seen in the radial direction.

Figure 4:
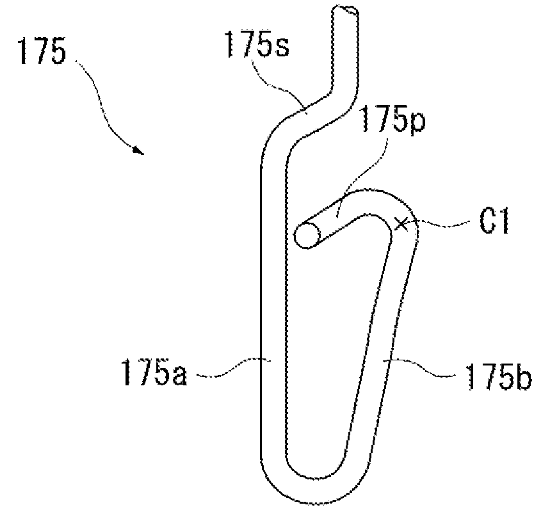
FIG. 4 is a perspective view showing a modification of a metal terminal.

However, for example, as shown in FIG. 4, a stopper portion 175*p* may be provided at a position different from the contact portion C1, along the radial direction of the metal terminal 175. In the example in FIG. 4, specifically, the stopper portion 175*p* is formed by bending a distal end (serving as a free end) of a spring-contact portion 175*b* in an L shape toward the direction along the main surface of the sensor element 21, and a distal end part of the spring-contact portion 175*b* relative to the stopper portion 175*p* is made to protrude toward the electrode pad 24 side, so that the protruding part becomes the contact portion C1.

Here, the body portion 75*a* and the bent portion 75*s* in FIG. 2 are referred to as the body portion 175*a* and the bent portion 175*s*, respectively.

The stopper portion 75*p*, 175*p* needs to be located on the distal-end side (spring-contact portion 75*b* side) relative to the folded part between the body portion 75*a* and the spring-contact portion 75*b*, of the metal terminal 75, 175. This is because the distal-end side relative to the folded part is readily deflected and displaced in the widthwise direction of the sensor element 21.

In this example, the metal terminals 75 are provided with the stopper portions 75*p* located on both end sides in the widthwise direction of the sensor element 21. This is because the metal terminals 75 at ends of the sensor element 21 are more readily swayed than the metal terminal 76 at the center. However, without limitation thereto, the metal terminal 76 may be provided with the stopper portion at the center in the widthwise direction of the sensor element 21.

Figure 5:
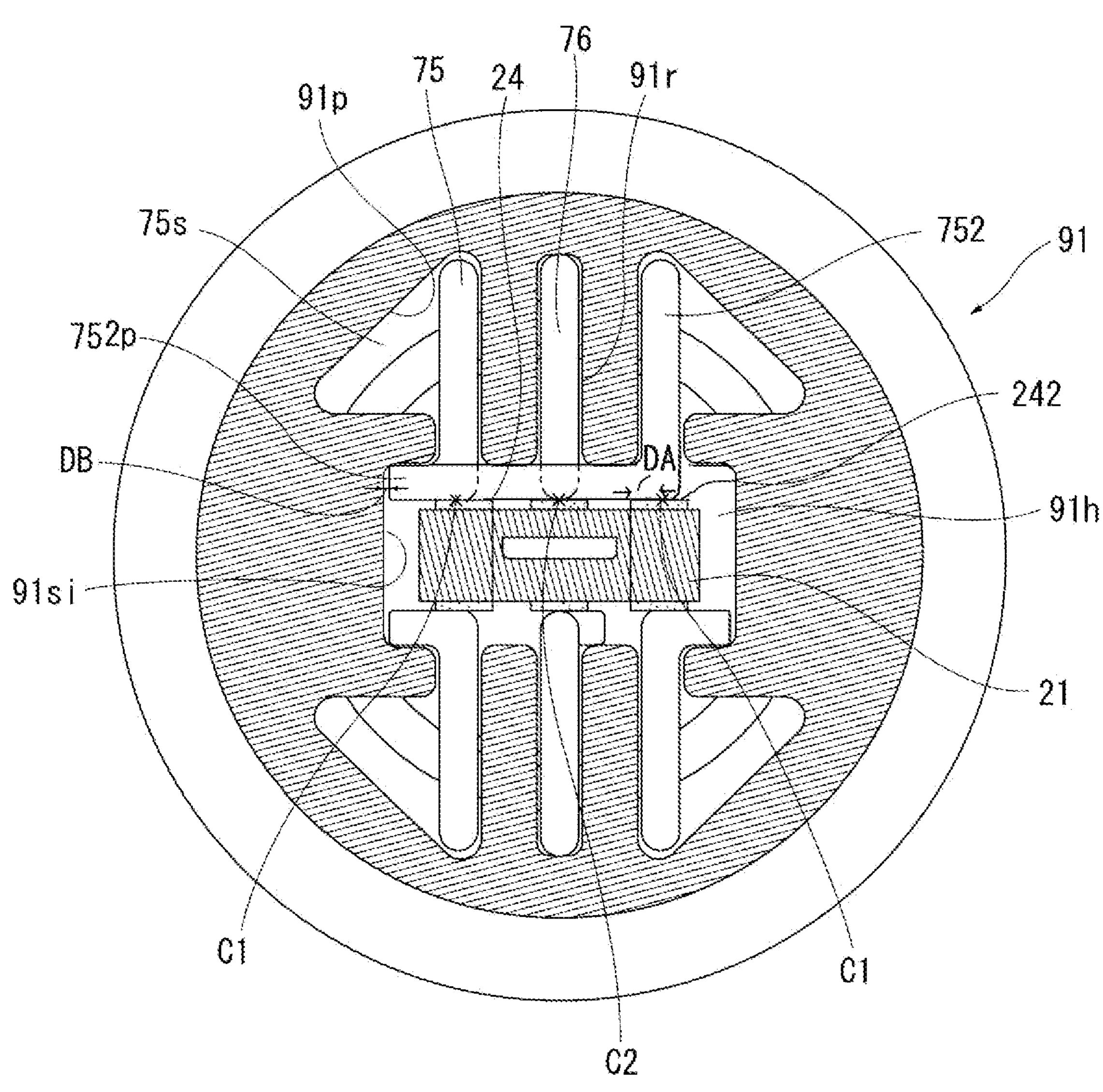
FIG. 5 is a sectional view showing an example in which a stopper portion of a metal terminal extends toward an inner surface on the far side, of inner surfaces of a separator in the widthwise direction of a sensor element.

As shown in FIG. 5, a stopper portion 752*p* of a metal terminal 752 may extend toward the inner surface 91*si* on the far side, of the two inner surfaces of the separator 91 in the widthwise direction of the sensor element 21.

Specifically, in FIG. 5, a pair of one electrode pad 242 and one metal terminal 752 connected thereto will be considered. The electrode pad 242 is located at the rightmost position, of the three electrode pads 24 on the one main surface (upper surface in FIG. 2) of the sensor element 21. The metal terminal 752 is located at the right position, of the two metal terminals 75. In the pair of the electrode pad 242 and the metal terminal 752 described above, as seen along the widthwise direction of the sensor element 21, an end of the electrode pad 242 that is closest to the one inner surface 91*si* (inner surface of side wall 91*s*) of the separator 91 is defined as a pad end, the distance between the pad end and the contact portion C1 is defined as DA, and the distance between the one inner surface 91*si* and the stopper portion 752*p* of the metal terminal 752 is defined as DB. Then, DA>DB is satisfied. Here, the one inner surface 91*si* is the left inner surface, of the two inner surfaces of the separator 91 in the widthwise direction of the sensor element 21, and is the inner surface farther from the electrode pad 242 and the metal terminal 752.

Also in the example in FIG. 5, since the distance DA between the pad end and the contact portion C1 is greater than DB, it is possible to prevent such connection of the metal terminal 752 with the electrode pad 242 from becoming broken and reliability of electric connection from becoming lowered.

The metal terminal 752 in FIG. 5 is formed such that the stopper portion 752*p* extends in the widthwise direction of the sensor element 21 on the rear-end side relative to the other metal terminals 75, 76.

In a case where the metal terminal has a bar shape, the metal terminal whose sectional shape is a circle or a polygon having an aspect ratio of 1:1.0 to 1:1.2 can be used, for example.

The gas sensor to which the present disclosure is applied is not limited to an oxygen sensor. A gas sensor for detecting another kind of gas, such as a NOx sensor or a hydrogen sensor, may be used, as long as the gas sensor includes the metal terminal.

The sensor element is not limited to a plate shape, and may be a tube-shaped element.

In this example, the stopper portion is a portion integrated with the metal terminal and is formed by bending a part of the metal terminal. However, for example, a separate stopper portion having a plate shape may be joined at a predetermined position on the metal terminal by welding or the like.

The disclosure has been described in detail with reference to the above embodiments. However, the disclosure should not be construed as being limited thereto. It should further be apparent to those skilled in the art that various changes in form and detail of the disclosure as shown and described above may be made. It is intended that such changes be included within the spirit and scope of the claims appended hereto.

This application is based on Japanese Patent Application Nos. 2022-129173 filed Aug. 15, 2022 and 2023-067080 filed Apr. 17, 2023, the disclosures of which are incorporated herein by reference in their respective entireties.

What is claimed is:

1. A gas sensor comprising:

a sensor element extending in an axial-line direction and having an electrode pad on a rear-end-side outer surface thereof;

a metal terminal extending in the axial-line direction and electrically connected to the electrode pad via a contact portion; and a tubular separator extending in the axial-line direction and retaining a rear-end side of the metal terminal, wherein the metal terminal includes a stopper portion extending in a direction crossing the axial-line direction, the contact portion and the stopper portion are housed inside the separator, and where, in a pair of one of said electrode pad and one of said metal terminal connected thereto, as seen along a widthwise direction of a cross section of the sensor element that is perpendicular to the axial-line direction, an end of the one electrode pad that is closest to one inner surface of the separator is defined as a pad end, a distance between the pad end and the contact portion is defined as DA, and a distance between the one inner surface of the separator and a distal end of the stopper portion is defined as DB, DA>DB and DB>0 are satisfied.

2. The gas sensor as claimed in claim 1, wherein the stopper portion is provided at a position different from the contact portion.

3. The gas sensor as claimed in claim 2, wherein the metal terminal has a bar shape.

4. The gas sensor as claimed in claim 3, wherein the sensor element is plate-shaped, and the widthwise direction is in line with the rear-end-side outer surface of the cross section of the plate-shaped sensor element.

5. The gas sensor as claimed in claim 4, a plurality of the electrode pads are provided in parallel on the rear-end-side outer surface of the plate-shaped sensor element.

6. The gas sensor as claimed in claim 2, wherein the sensor element is plate-shaped, and the widthwise direction is in line with the rear-end-side outer surface of the cross section of the plate-shaped sensor element.

7. The gas sensor as claimed in claim 6, a plurality of the electrode pads are provided in parallel on the rear-end-side outer surface of the plate-shaped sensor element.

8. The gas sensor as claimed in claim 1, wherein the metal terminal has a bar shape.

9. The gas sensor as claimed in claim 8, wherein the sensor element is plate-shaped, and the widthwise direction is in line with the rear-end-side outer surface of the cross section of the plate-shaped sensor element.

10. The gas sensor as claimed in claim 9, a plurality of the electrode pads are provided in parallel on the rear-end-side outer surface of the plate-shaped sensor element.

11. The gas sensor as claimed in claim 1, wherein the sensor element is plate-shaped, and the widthwise direction is in line with the rear-end-side outer surface of the cross section of the plate-shaped sensor element.

12. The gas sensor as claimed in claim 11, a plurality of the electrode pads are provided in parallel on the rear-end-side outer surface of the plate-shaped sensor element.

* * * * *